United States Patent [19]

McKelvie

[11] Patent Number: 4,628,834
[45] Date of Patent: Dec. 16, 1986

[54] VIBRATORY FLUIDIZED BED REACTOR

[76] Inventor: Alastair H. McKelvie, Derry Gally Rd., Kinnelon, N.J. 07405

[21] Appl. No.: 491,776

[22] Filed: May 11, 1983

Related U.S. Application Data

[63] Continuation-in-part of Ser. No. 311,468, Oct. 14, 1981, Pat. No. 4,384,535.

[51] Int. Cl.[4] ............................................. F23D 1/00
[52] U.S. Cl. ................................. 110/263; 110/165 R; 110/245; 122/4 D
[58] Field of Search .............. 110/245, 263, 257, 258, 110/278, 281; 122/4 D; 431/7, 170; 126/170, 176 R, 155; 198/757, 763, 768; 34/147

[56] References Cited

U.S. PATENT DOCUMENTS

| | | | |
|---|---|---|---|
| 2,688,807 | 9/1954 | Ginther | 34/147 |
| 3,587,833 | 6/1971 | Byrum | 198/757 |
| 4,172,425 | 10/1979 | Sheridan | 110/257 |
| 4,250,818 | 2/1981 | Sigg | 110/281 |
| 4,258,005 | 3/1981 | Ito et al. | 110/245 |
| 4,267,801 | 5/1981 | Robinson | 110/245 |
| 4,326,469 | 4/1982 | Reschly | 110/292 |
| 4,384,535 | 5/1983 | McKelvie | 110/165 R |
| 4,385,567 | 5/1983 | Voss | 110/257 |
| 4,389,978 | 6/1983 | Northcote | 110/281 |

FOREIGN PATENT DOCUMENTS 1455702 11/1976 United Kingdom ................ 198/768

*Primary Examiner*—Albert J. Makay
*Assistant Examiner*—Steven E. Warner
*Attorney, Agent, or Firm*—Curtis, Morris & Safford

[57] ABSTRACT

A vibratory fluidized bed reactor vibrates a solid particle bed to fluidize the bed, and air or other gaseous stream is injected into the bed. The reactor can employ a rotationally-vibrated bowl or a linearly-vibrated pan. The vibratory motion keeps the particles evenly distributed and prevents blowholes from developing, leading to improved reaction. The vibratory motion also marches particles up a spiral groove in the circumferential wall of the bowl, e.g., to facilitate ash removal from the fuel bed, to recycle reactants or catalysts, to sequence reactants to subsequent stages, etc. In the case of the pan, vibratory motion marches the particles up an inclined plate.

20 Claims, 17 Drawing Figures

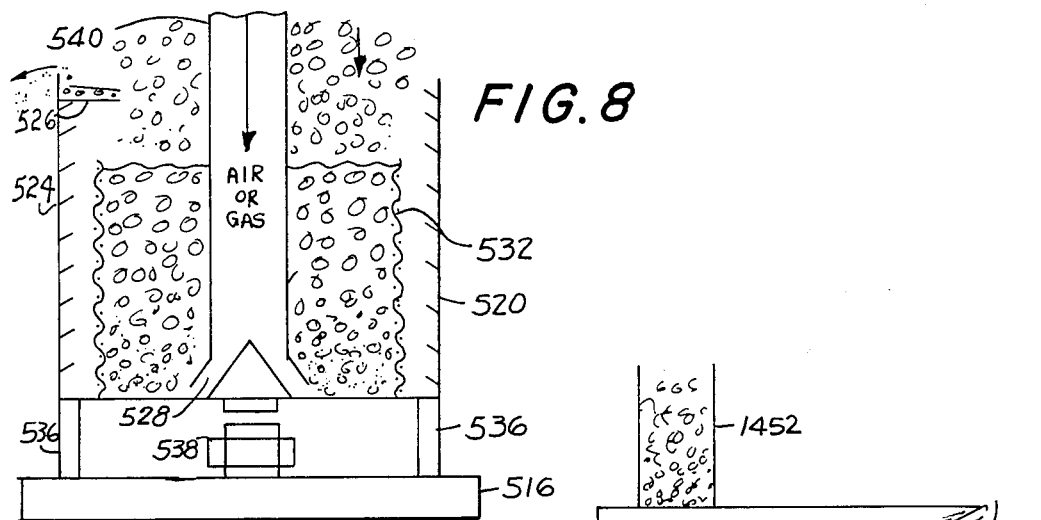
FIG. 8
FIG. 14
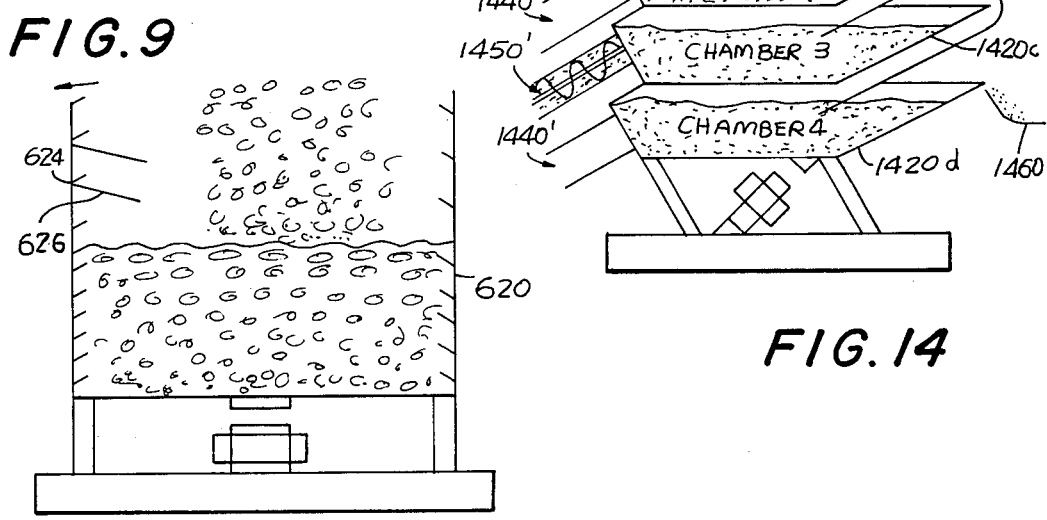
FIG. 9
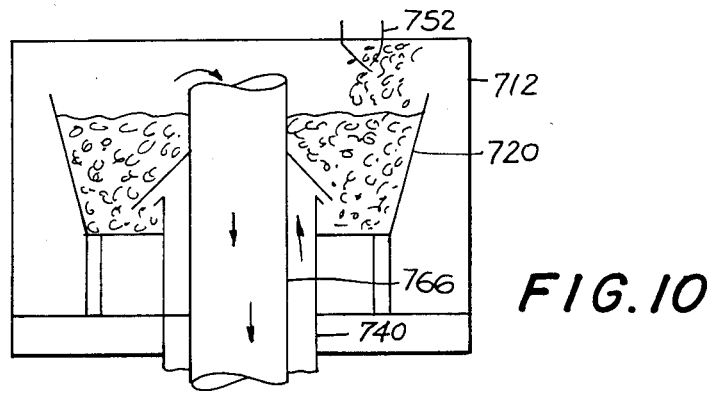
FIG. 10

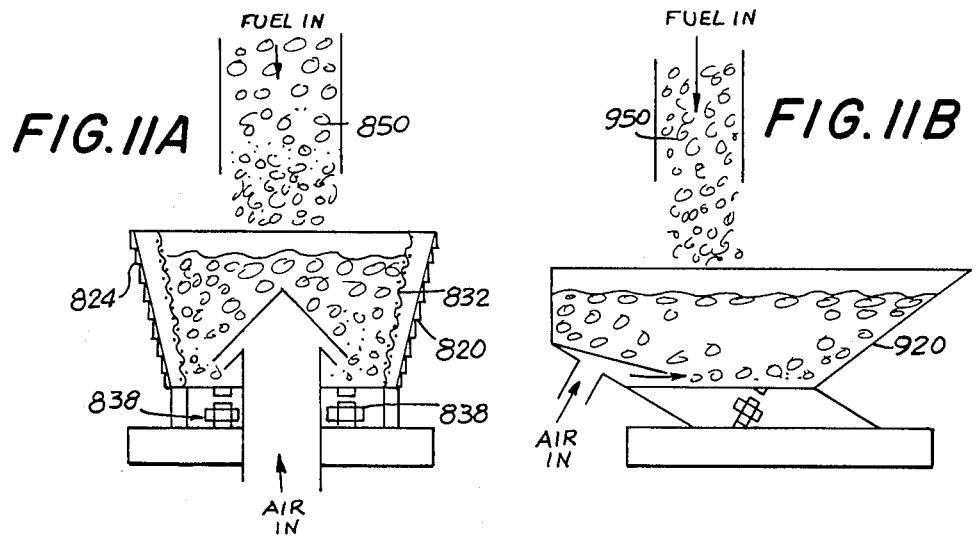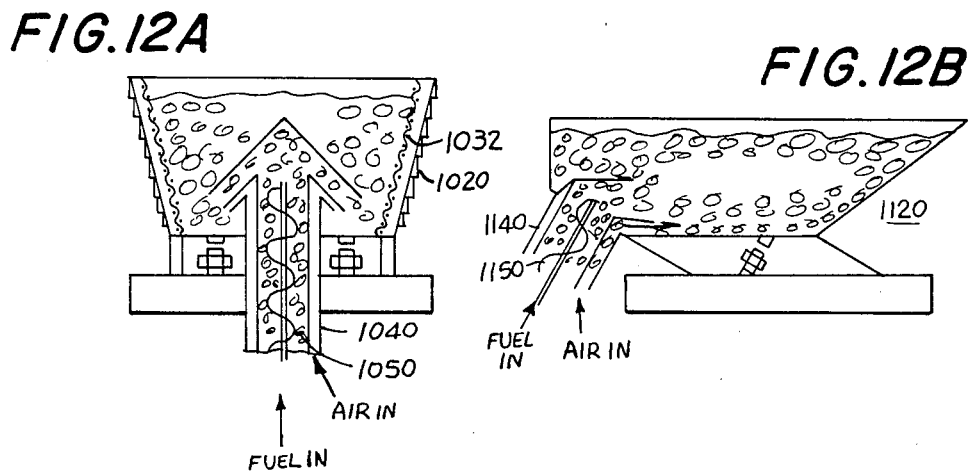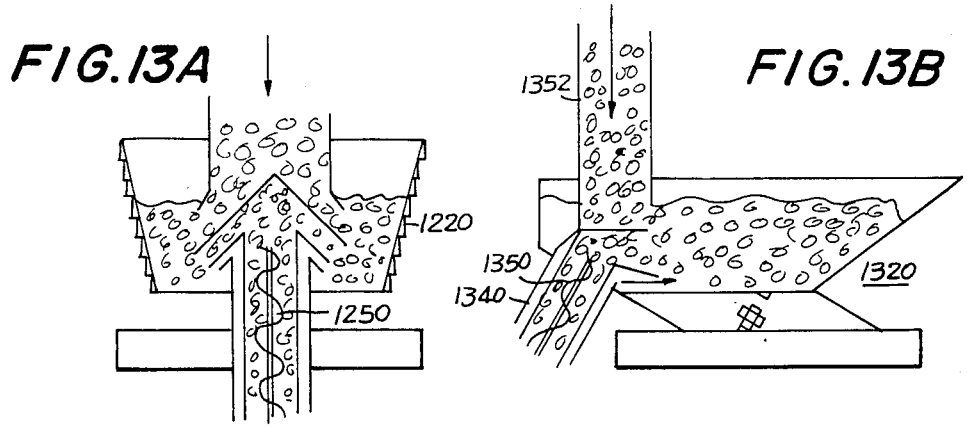

VIBRATORY FLUIDIZED BED REACTOR

CONTINUATION APPLICATION DATA

This is a Continuation-in-part of my copending patent application Ser. No. 311,468, filed Oct. 14, 1981, now U.S. Pat. No. 4,384,535, granted May 24, 1983.

BACKGROUND OF THE INVENTION

1. Field of the Invention:

This invention relates to fluidized bed reactors and furnaces, and is particularly directed to a solid-particle reactor employing a vibratory bed for the particles.

2. Description of the Prior Art:

Solid fuel stoves and furnaces have been proposed in which the fuel is introduced therein, for example, on a chain grate. This facilitates automatic stoking and ash or cinder removal, but cannot guarantee complete and efficient combustion. In order to enhance combustibility, forced air is introduced into the bed of solid fuel in the furnace to circulate and provide sufficient oxygen to the burning coals of solid fuel. However, the fuel, as it burns, can become rather compacted, and normally a great deal of pressure is required to ensure adequate air circulation. Even then, the forced air tends to take the path of least resistance through the fuel bed. Consequently, so-called blow holes develop which form channels for the forced air, and the air ceases to reach more compacted masses of fuel apart from the blow holes. Further, the forced air passes more quickly through the blow holes and tends to cool the burning coals, thereby keeping the heating system below maximum heating efficiency.

Additionally, ash removal systems tend to be rather complex and inefficient, and their presence further interferes with the efficient combustion of the solid fuel.

Furthermore, conventional solid fuel heating apparatus, such as wood stoves or stoker coal furnaces, tend to burn dirty, emit considerable smoke, and require frequent cleaning. Such apparatus cannot burn a wide range of fuel types and sizes, and do not operate well if the fuel is wet.

Pulverized coal burners are in common use, especially among electric utilities. These burners inject coal as a fine powder into a combustion chamber, where it is mixed with air and burned. Although these produce more heat with less coal than stokers, they also emit much higher levels of pollution and require large and expensive pollutant-trapping equipment on their exhaust stacks.

Fluidized bed combustion chambers employ a bed of crushed coal covered with a layer of granular material, usually including crushed limestone. Air is forced at rather high pressures up through the bed causing the coal and granular material to "boil" so that the crushed coal particles are suspended in air. Combustion takes place at a relatively low temperatures, so that clumps or clinkers of ash form less frequently and there is far less nitrogen oxide produced. Sulfurous wastes are trapped in the limestone granules.

Unfortunately, these fluidized bed chambers have severe disadvantages. For one thing, the fluidized bed furnaces are large, complex systems that require a significant amount of maintenance, so that a full time monitor is almost always required. Another problem of the fluidized bed burners is their immensity: because the bubbling mixture is sometimes blown more than ten meters into the air, the chambers must be constructed as silos from ten to twenty five meters high, complicating installation at existing factories or plants, and making installation impossible in a home heating plant.

Still another disadvantage is that heat paths or channels (i.e., blow holes) often occur in the fluidized bed. That is, the path of air through the bed will follow the path of least resistance, and often combustion occurs only along certain channels. The blasting of compressed air does not always break up these channels to ensure efficient combustion.

Furthermore, a substantial amount of energy is consumed in compressing the air that must be blasted into the chamber to fluidize the bed.

Fluidized bed reaction chambers also have many applications in the petroleum and chemical process industries.

OBJECTS AND SUMMARY OF THE INVENTION

Accordingly, it is an object of this invention to provide solid-particle reactor apparatus that overcomes the above defects inherent in conventional stoves and furnaces.

It is another object of this invention to provide solid-particle reactor, such as solid-fuel burning heating apparatus which achieves even burning of its fuel while avoiding "blow holes" in the fuel bed and which permits lowering the air pressure required for the injected forced air.

It is yet another object of this invention to provide a solid-fuel burning furnace in which the bed of fuel is maintained in a more-or-less "fluidized" state, so that air can surround each particle of fuel, yielding even, improved combustion.

It is still another object of this invention to provide solid fuel burning heating apparatus in which ash removal is simplified and in which fines are readily combusted.

It is a further object of this invention to provide solid particle reactor apparatus which can be used as an efficient filter or as a reactor chamber for carrying out cleansing or reaction of a gas.

In accordance with one aspect of this invention heating apparatus are provided for use in burning solid fuel, which after combustion leaves an ash residue. The apparatus includes a fuel chamber, a combustion chamber, a mechanism for introducing solid fuel into the fuel chamber, a primary air jet for introducing air into the combustion chamber, an exhaust flue for venting exhaust from the combustion chamber, and a fuel bed extending from the fuel chamber into the combustion chamber. An improved feature of this apparatus can include a vibratory bowl having a generally circular base and a helically-grooved side wall with a helical groove or track therein extending around the wall from substantially the bottom to a top edge of the wall. A vibratory drive imparts a torsional vibration to the bowl so that ash produced by combustion is urged up the groove and out of the bowl, and is then conducted to an ash can or other container.

The vibrational motion, preferably related to the line-frequency rate (i.e. 50–60 Hz), keeps the coals and other fuel particles in motion as the forced air passes through the fuel. Thus, the solid fuel particles remain in a more-or-less fluidized state and are all bathed in the primary forced air, leading to even, clean combustion, even at an air pressure significantly lower than with prior art furnaces.

According to another aspect of this invention, heating apparatus are constructed wherein a fluidized bed is formed of a vibratory pan having a bottom and an inclined linear plate extending from the bottom in one direction to a discharge edge above the upper surface of the bed of fuel in the pan. This pan is vibratorially driven to fluidize the particles of fuel, and primary air is injected into the fuel particles below the upper surface of the bed of particles. Ash residue resulting from the combustion of the solid fuel particles is carried by vibration up the inclined surface and is conducted away to an ash repository. A screen can be used to confine the burning fuel particles, but the mesh of the screen is chosen to permit sifting of fine ash therethrough to be transported away.

A device for removing clinkers from the bed can be employed, as well as a roller crusher for crushing the clinkers into fine particles.

According to yet another aspect of this invention, a chemical reactor, such as a catalytic converter or an active filter, can employ a vibratory bed of fluidized solid particles to carry out reaction of a gaseous feedstock, or to cleanse a stream of gas to remove contaminants. The solid particles can be zeolites or other catalysts, or can be a filter absorbent or adsorbent material, such as limestone or charcoal.

Of course, the theory of this invention could also be applied to reactors in which a liquid is reacted with a vibrated bed of solid particles.

The above and other objects, features, and advantages of this invention will become apparent from the ensuing detailed description of several preferred embodiments, when read in connection with the accompanying drawings.

BRIEF DESCRIPTION OF THE DRAWINGS

FIG. 8 is a sectional elevation of yet another embodiment of a fluidized bed reactor according to this invention.

FIG. 9 is a sectional elevational view of still another embodiment of a fluidized bed reactor according to this invention.

FIG. 10 is a sectional elevation of a sealed-chamber vibratory bed reactor according to this invention.

FIGS. 11A and 11B illustrate an over-fed mode of devices according to this invention.

FIGS. 12A and 12B illustrate an under-fed mode of devices according to this invention.

FIGS. 13A and 13B illustrate a hybrid mode for reacting particles of different materials in devices according to this invention.

FIG. 14 illustrates an arrangement whereby successive stages of reaction can be sequenced in one apparatus.

DETAILED DESCRIPTION OF SEVERAL PREFERRED EMBODIMENTS

Figure 1:
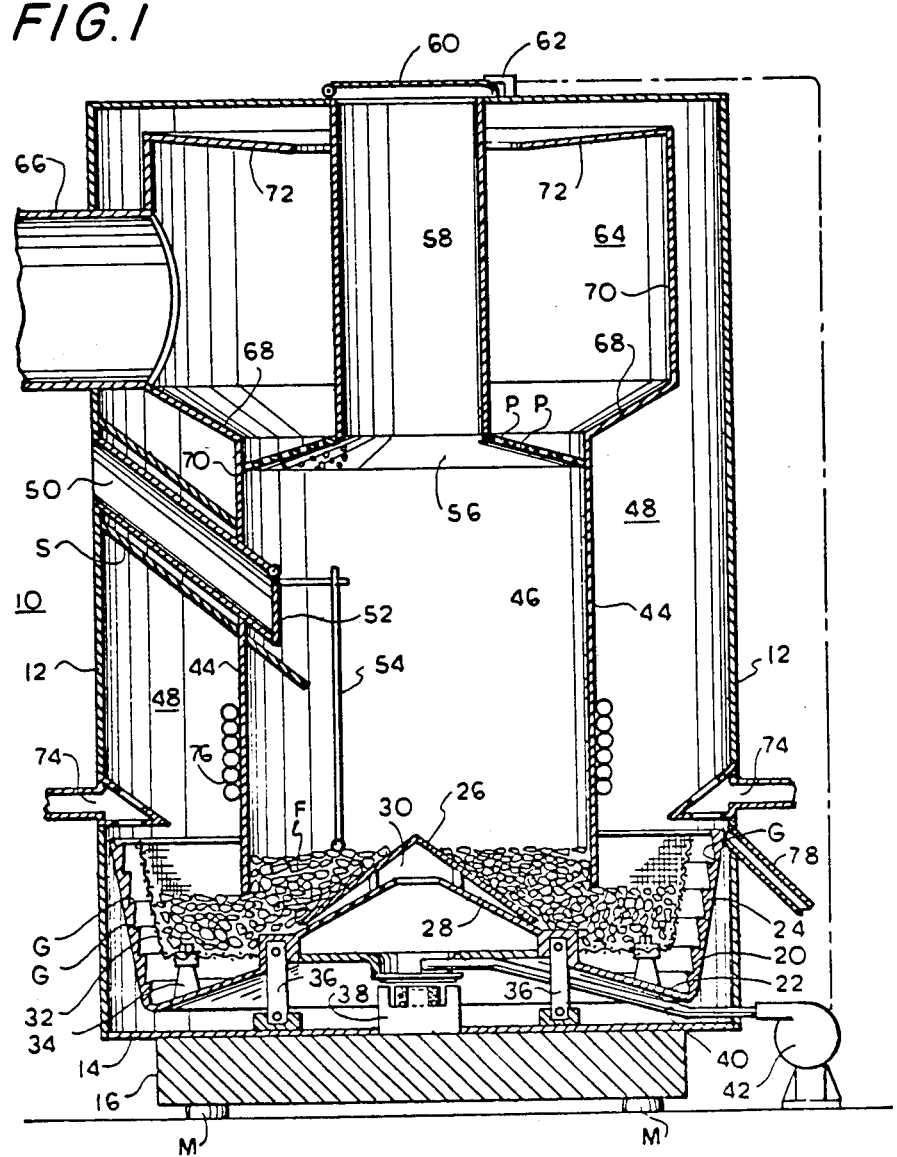
FIG. 1 is a sectional elevation of an embodiment of a furnace according to this invention.

Referring intially to FIG. 1, one exemplary furnace 10 embodying this invention has an outer wall 12, which can be lined with refractory material, forming generally a housing for the furnace 10. A floor 14 thereof is mounted on a base 16 of inertial material, which rests on three or more mounts M of elastomeric material.

Mounted centrally on the furnace floor 14 is a vibratory bowl 20 having a substantially circular floor 22 and an upstanding circumferential wall 24. As better seen in the perspective view of FIG. 2, this bowl 20 has a spiral groove G therein. In this embodiment a single helical groove G extends from the bottom to the top of the wall 24, although in other embodiments two or more such spiral grooves could be used.

The groove G carries ash A upward by vibratory motion, and so the groove G should have a pitch less than the angle of repose of the particles of ash A.

Disposed centrally on the floor 22 of the bowl 20 is a central cone 26 with an apexless inner cone 28 disposed coaxially therebeneath. The cones 26 and 28 are separated from each other somewhat and define a primary air passageway 30 therebetween. As will be seen later, air is preheated in the passageway 30 and also absorbs heat from the floor 22 of the bowl 20, thereby cooling it, before being ejected beneath the margin of the cone 26.

Figure 3:
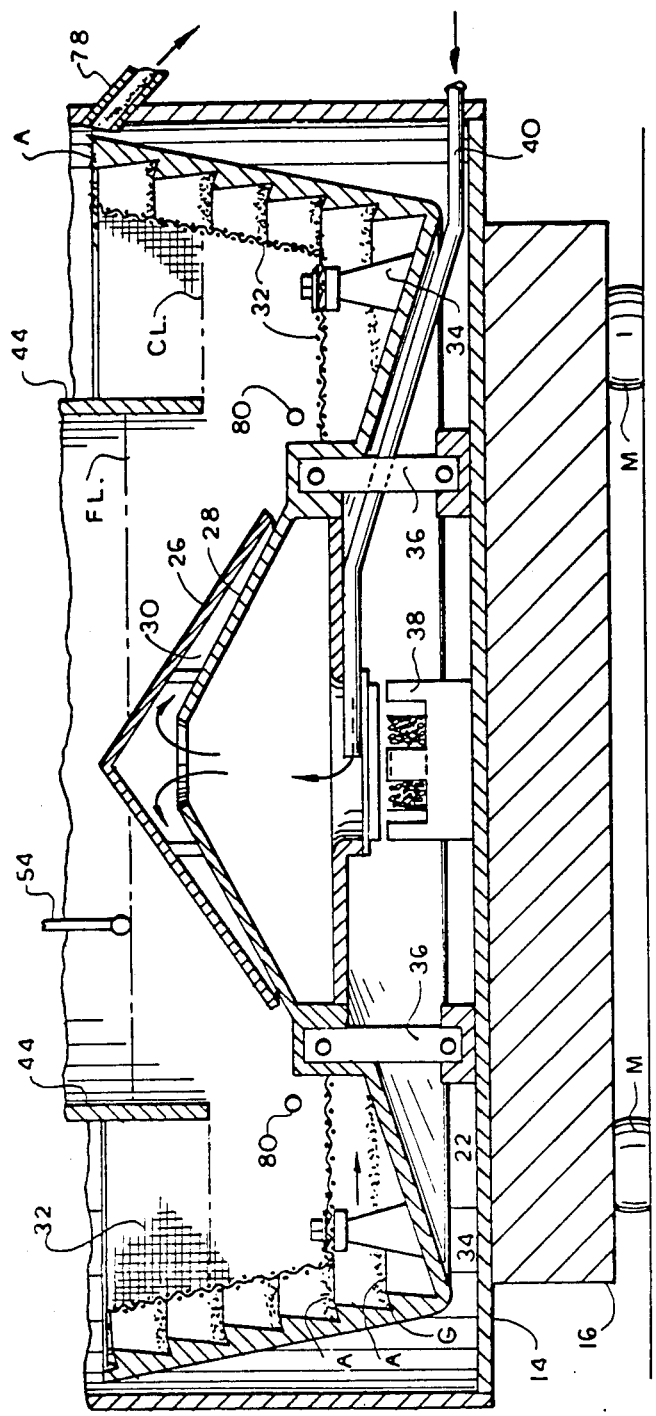
FIG. 3 is a sectional elevation of a portion of the furnace of FIG. 1.

As is perhaps better shown in FIG. 3, a screen 32 is provided as supporting web for particles of solid fuel F. The mesh of the screen 32 is selected to be smaller than the size of the burning coals of fuel F, but larger than the expected size of particles of ash A. Support posts 34 mounted around the floor 22 of the bowl 20 support the screen 32 above the floor 22, which slopes downwardly towards the wall 24. The arrangement including the screen 32 ensures that ash A is carried out from beneath the bed of fuel F up the groove G.

The support posts 34 are joined at the level shown in ghost lines thereon to form a dam for the ash A, thereby causing a layer of the ash A to accumulate beneath the burning coals. This layer insulates the floor 22 from extreme heat of combustion.

A vibratory drive for the furnace 10 includes a set of mounting springs 36 and a vibratory drive motor 38 having an armature disposed on the furnace floor 14 and a movable member centrally disposed on the bottom side of the floor 22 of the bowl 20. The armature thereof is fed with half-wave rectified line current, and causes the bowl 20 to be pulled intermittently downward and then released. The mounting springs 36, which are canted somewhat and mounted at points on the bowl 20, cause the bowl 20 to rotate slightly when it is drawn down, and then impart a twisting thrust thereto when the motor 38 releases the bowl 20. Thus, the particles of ash A are vibrated clockwise, and move up the groove G to the top of the wall 24.

The furnace 10 also includes a primary air duct 40 extending to the center of the bowl 20 at a point within the cone 28. Forced primary air is then supplied through the duct 40, upward through the cone 28 into the air passageway 30 and thence under the rim of the cone 26. A blower 42 supplies the forced primary air to the duct 40.

The furnace 10 also includes a fuel magazine, here constructed as a cylindrical wall 44 disposed concentrically with the bowl 20 and within the wall 12. The magazine wall 44 defines a fuel chamber 46, (i.e., the cylindrical core therewithin) and a combustion chamber 48 (i.e., the annulus between the walls 12 and 44).

The lower edge of the magazine wall 44 is disposed below the top of the wall 24 but above the floor 22 of the bowl 20, and defines a combustion level CL of the fuel F in the combustion chamber. A corresponding fuel level FL of the fuel in the fuel chamber 48, disposed above the level CL, is determined in a manner described below.

A fuel feed chute 50 extends through the walls 12 and 44 into the interior of the fuel chamber 46. A door 52 closes off the magazine end of the chute 50, and a fuel-level sensor rod 54 is affixed to the door 52. A shield S surrounds the chute 50 to prevent fuel therein from being heated to the combustion point.

Fuel is furnished, for example from an, archimedean screw (not shown), to the chute 50. A switch (not shown), on the door 52 normally closes when the door 52 swings completely closed. The archimedean screw is operated intermittently for several seconds at a time. The fuel F then proceeds down the chute 50, opening the door 52 and lifting the rod 54. When the fuel F stops, the door 52 is free to close. As long as the actual fuel level is below the level FL, the rod 54 will drop below the level FL and the door 52 will close completely and the switch closes. However, when the new fuel F causes the level FL to be met or exceeded, the rod 54 will drop down only to the top of the fuel, above the level FL, and although the door 52 will be completely closed, the switch will remain open, and the periodic cycling of the archimedean screw is stopped. Thus, the fresh fuel level is kept substantially at the level FL. Once the level of the fuel F is drawn down below the level FL, the door 52 will close completely, and the feed cycle will begin again.

The magazine also includes a top 56 with perforations P therein. These perforations P permit moisture from the fuel F in the fuel chamber 46 to pass out thereof.

A maintenance access chute 58 extends upward from the center of the top 56, and is provided for enabling inspection and cleaning of the interior of the furnace 10. A door 60 is provided to close off the maintenance access chute 58. A safety interlock 62, coupling to the blower 42, ensures that the primary air will be furnished only if the door 60 is closed.

An exhaust chamber 64 is provided at the top of the furnace 10 and connects to an exhaust flue 66. A baffle 68 extends from the top of the magazine 44 radially outward toward the wall 12 to separate the combustion 48 from the exhaust chamber 64. A vertical cylindrical collar 70 is disposed at the radially outward edge of the baffle 68 and another baffle 72 extends inward from the collar 70 toward the chute 58. The interior of the baffles 68, 72 and the collar 70 defines the exhaust chamber 68, while an annulus between the collar 70 and the wall 12 and the space between the baffle 72 and the top of the housing 10, cause cycloning of the combusting gases and solid particles carried therewith. This spirals the flame path, and thereby lengthens it for more efficient combustion. The structure 68, 70, 72 also causes the gas velocity to drop at the position over the top 56 of the magazine 44, and any unburned solid particles remaining drop from the gas. These then pass through the perforations P in said top 56 and enter the fuel chamber 46 to be recycled.

Also included in the furnace are secondary air inlet jets 74 for introducing secondary air into the combustion chamber at a point above the fuel F.

Optional water heating coils 76 can be disposed, for example, on the outside of the magazine wall 44.

An ash conduit 78 is provided to carry the ash A from the end of the groove G to an ash canister (not shown) outside the furnace.

An electric heating element 80 can also be disposed inside the bowl 20, for example, encircling the rim of the cone 26, for initially igniting the fuel F, or for re-igniting the same if it should become extinguished.

In operation, the fuel F is introduced through the chute 50 into the fuel chamber 46. The fuel F is distributed outward by the cone 26 and is ignited by the element 80. Forced primary air is injected, from the conduit 40, through the air passageway 30 between the cones 26 and 28, into the fuel F in the combustion chamber 48. At this time the bowl 20 is vibrated, and the fuel F is vibrated along with it. This vibration keeps the fuel F in motion in the combustion chamber, so that by action of the primary air passing through it, in combination with the vibration, the burning fuel becomes fluidized. The particles of fuel F burn evenly and completely, leaving the ash residue A. The problem of "blow holes" in the fuel bed is completely avoided. The ash residue A then falls through the screen 32 and is marched up the groove G to the ash conduit 78.

As the fuel F in the fuel chamber 48 is spent, the cone 26, which is also vibrated, urges the fresh fuel F in the fuel chamber 46 to move radially to the combustion chamber 48. Thus, fresh fuel F is continuously supplied as the fuel F is used up, and the burning coals of the fuel F in the outer combustion chamber are not smothered by the fresh fuel, as in conventional apparatus.

The secondary air jets 74 ensure that the gases above the bed of coals in the combustion chamber 48 are completely oxidized, thereby reducing the levels of CO as well as more efficiently combusting the fuel F. Fines of the fuel are also combusted more readily.

Further, the design of this invention permits the fuel F in the fuel chamber 46 to be preheated and dried, if necessary, so that the fuel F will burn more efficiently. With this invention, moisture-laden fuel, such as green wood or garbage, can be burned without degrading the operation of the furnace. In the case of garbage, fumes emanating therefrom are burned by the exhaust gas passing over the perforated top 56.

Alternatively to the above described embodiment, a fuel inlet could be provided directly above the cone 26. Also, air injection jets for the primary air could be disposed above or below the bed of fuel F.

The invention could also be practiced using other than spirally-grooved bowl 20 for ash removal. For example, a reciprocally vibrated bed could be used, having inclined planes, smooth or stepped as required, disposed thereon to carry ashes out of the furnace.

Jets for oil or natural gas can be included to supplement the solid fuel or to use an alternative fuel in place of it in times of short supply.

Vanes can be included above the fuel bed to reflect heat back and downward into the combustion chamber 48, thereby leading to improved burning efficiency.

Also, the location of the drive motor 38 is not critical, and other drive arrangements could be used. For example, a balanced two-motor drive system could be used, with the motors displaced away from the center of the bowl 20.

In addition, a sweeper blade can be used on the spiral groove G to ensure that particles larger than a predetermined size (i.e., unburned fuel) are returned to the fuel bed.

Figure 4:
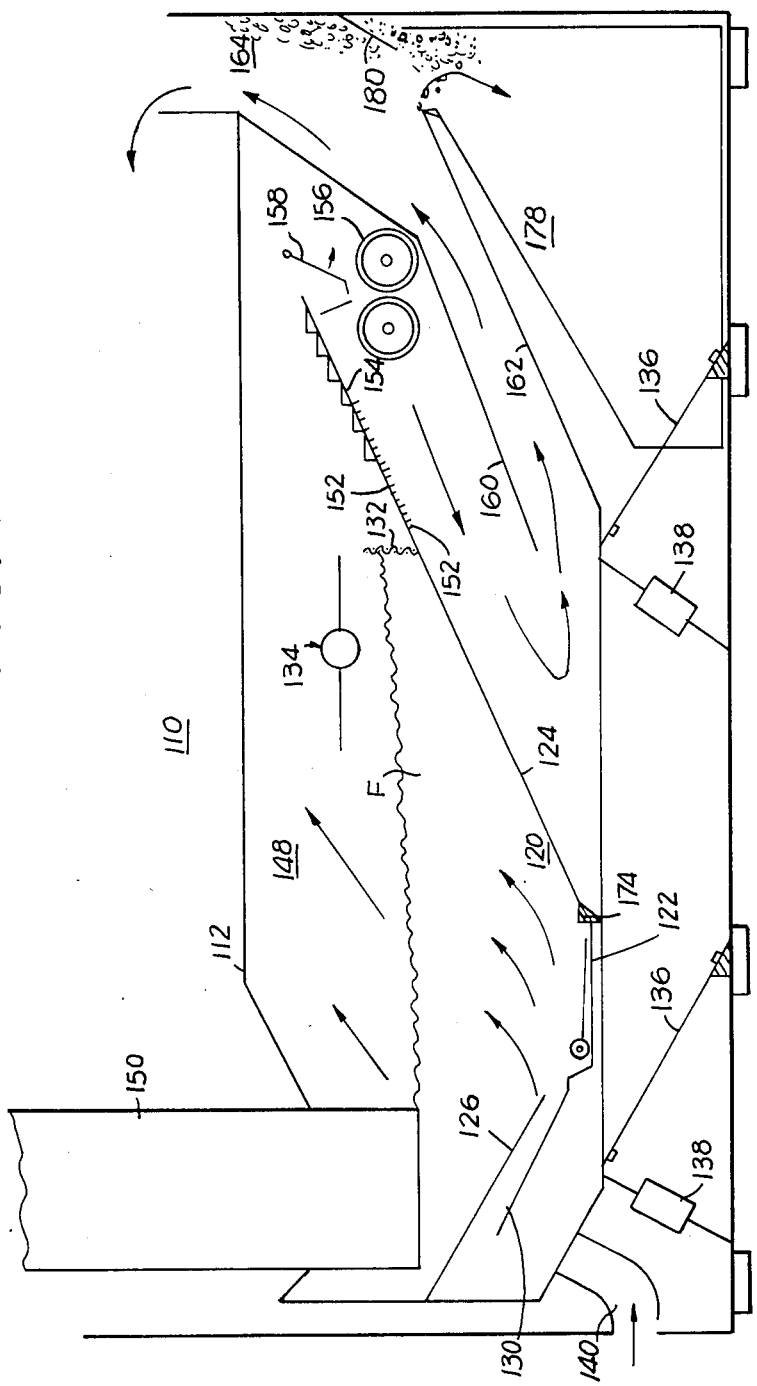
FIG. 4 is a sectional elevation of another embodiment of a furnace according to this invention.

Referring now to FIG. 4, a linear type vibrational solid-fuel burning furnace 110 is shown. In this embodiment, elements corresponding to similar elements in the first embodiment are identified with the same reference characters, but raised by 100. In this linear furnace 110, a linear pan 120 is employed, in place of the rotationally-vibrated bowl 20 of FIG. 1, and this pan 120 is vibrated in its lengthwise direction.

The pan 120 has a bottom 122, and a sloping flat plate 124 inclined upward from the bottom to an upper discharge edge thereof. On the side of the pan 120 opposite this plate 124 is a feed surface 126 which slopes downward to the bottom 122. Fuel F is supplied into the furnace to form a fuel bed which is maintained on the pan 120. A screen 132 is arranged transverely of the sloping flat surface 124 and rises vertically therefrom to define a barrier for the fuel bed. This screen 132 has a predetermined mesh, whereby unburned fuel particles, being too large for the mesh, do not pass through, but fine ash particles can pass through and be disposed of.

A clinker removing device 134 is disposed over the fuel bed near the screen 132. This device 134 has a transverse rotating shaft and flexible radial fingers thereon. The device 134 is rotated to kick clinkers or other large ash particles over the screen 132. The fingers pass readily through the fuel particles, removing only the clinkers.

Sloping springs 136 and solenoid drivers 138, constitute the vibrational drive for the furnace 110.

An air inlet 140 is arranged tangentially to the direction of spring movement, and supplies air through a primary air inlet 130 beneath the feed surface 126 to the fuel F in the fuel bed.

A combustion chamber 148 is defined by the space between the upper surface of the fuel bed in the pan 120 and the upper wall 112 of the furnace 100. A hopper-type over-feed fuel feeder 150 extends downward to the upper surface of the fuel bed, and supplies fresh fuel to the pan 120.

Figure 2:
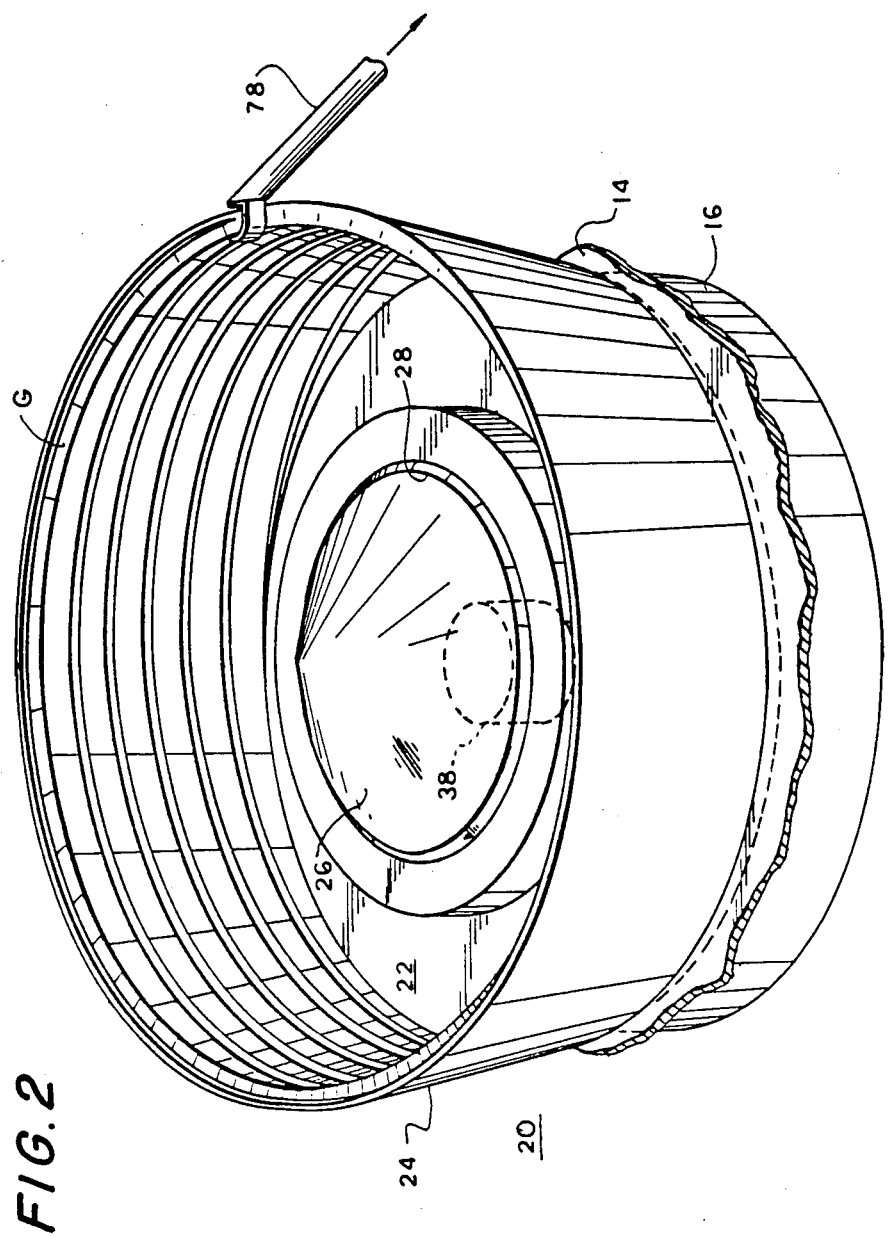
FIG. 2 is a perspective view of a portion of the furnace of FIG. 1.

When the air is supplied through the primary air inlet 130 to the fuel bed, combustion takes place in a manner similar to that described with respect to FIGS. 1-3. The vibration of the pan 120 causes fine ash particles to gravitate towards the bottom the fuel bed, with the larger, unburned fuel particles being moved upwards. The inclined plate 124 has a rough surface, and acts to carry the fine ash in the upward direction, where the ash proceeds through the screen 132 and through fine slots 152 in the plate 124 above the screen 132, which slots permit the ash particles to pass therethrough to a downflow area beneath this plate 124. Because of its ash removal feature, the plate 124 should have an incline somewhat less steep than the angle of repose of the ash residue. Steps 154 can optionally be provided above the area of the slots 152. Such steps would permit larger particles, such as clinkers, to be carried to an upper edge of the plate where they can be crushed to fine particles by a pair of crusher rollers 156. An activating switch 158 provided above the rollers 156 starts the rollers whenever a clinker or other large particle strikes it.

A fixed baffle 160 slopes generally downward to define, with the lower surface of the plate 124, the downflow area. A vibrating conveyor plate 162 extends slopingly upward below the fixed baffle 160, and defines with it an upflow path for burning gasses from the combustion chamber. These gasses pass out through an outlet 164 to a heat exchanger or similar device. A secondary air inlet 174 can be provided between the downflow path and the upflow path, favorably at the base of the plate 124, to introduce additional oxygen for combustion.

The vibrating conveyor plate 162 carries the ash plus any crushed clinker material to an inlet of an ash container 178. A guide 180 for fly ash particles returning from the exhaust outlet 164 also leads to the ash container 178.

As mentioned previously, the principles of this invention are not limited only to furnaces, but can be employed in many types of chemical reactor apparatus, for example, fluidized-bed filters for filtering contaminants from industrial gas, or fluidized bed reactors for carrying out syntheses of chemical compounds.

Figure 5:
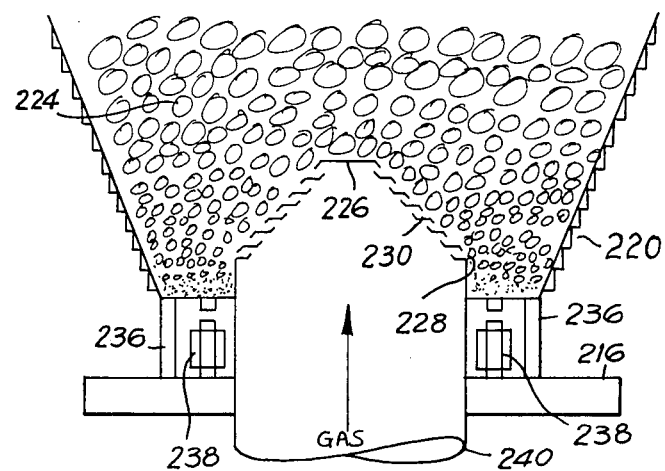
FIG. 5 is a sectional elevation of an embodiment of a vibratory bed gas cleaner employing the principles of this invention.

FIG. 5 illustrates generally a gas cleaner employing the principles of this invention. Here elements corresponding to elements described previously bear the same reference numerals, but revised by 200. In this embodiment a rotary vibrational bed 220 is disposed on a base 216 and contains solid particulate filter material 224. The vibrational action of the bowl 220 tends to stratify the particulate material 224 with the larger particles moving towards the top and the finer ones to the bottom. Thus, it is possible to filter the gas through a predetermined sequence of layers of material, and to maintain the strata of material, by selecting the size of particles for various filtering materials.

In this embodiment, a distribution cone 226 has a plurality of gas outlets 228 distributed along the conic surface 230 thereof, that is, not only along the lower edge, but at various stages between the edge and the center or apex thereof. Here, there are shown springs 236 and solenoids 238 constituting the vibrational drive for the bowl 220. A gas inlet 240 supplies the gas to be filtered from below to the distribution cone 226.

Figure 6:
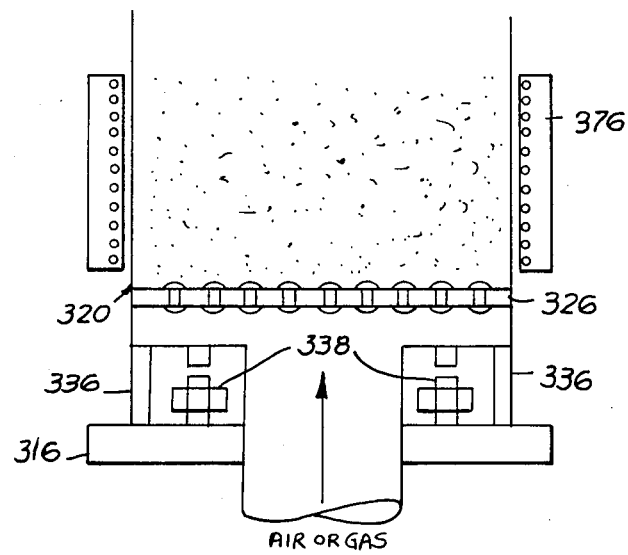
FIG. 6 is a sectional elevation of an embodiment of a fluidized bed furnace employing the principles of this invention.

FIG. 6 shows a fluidized bed furnace employing this invention, including a base 316 and a pan or bowl 320 mounted to the base 316 by means of springs 336 and drive solenoids 338. An under-feed gas inlet 340 supplies gas to a diffusion plate 326 disposed slightly above the bottom of the bowl 320. The inlet gas proceeds through apertures or pores in the plate 326 and provides an atmosphere in which the cleaning or heat treatment of parts takes place. Particles vibrated within the bowl 320 transfer heat to those parts from heaters or heat exchanger coils 376 which surround the sides of the bowl 320. These coils 376 can be used to supply heat for endothermic reactions, or as a heat source for a fluidized bed of inert particles.

Figure 7:
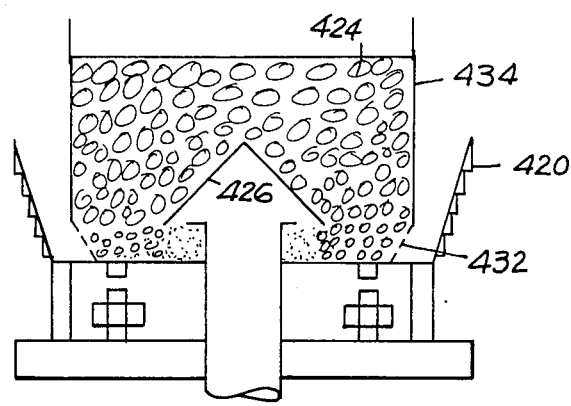
FIG. 7 is a sectional elevation of an embodiment of a fluidized bed reactor according to this invention, utilizing the stratification effect characteristic of its operation.

FIG. 7 shows a rotary type vibrational bed reactor device incorporating a stratified screen retainer or liner. Here, a vibratory bowl 420 contains solid particulate material 424 within a liner formed by a perforated screen 432 extending up a short distance from the bottom of the bowl 420, and a solid barrier 434 extending from the screen 432 to a point above the top surface of the bed of particulate material 424.

It should be appreciated that in the device of FIG. 7, the vibratory action stratifies the material 424 with the larger particles thereof rising towards the top, and with the finest particles gravitating toward the bottom. Thus, the perforated screen section 432 need only be located at the bottom where the fine ash or other particles are likely to migrate to.

FIG. 8 shows yet another vibratory bowl reactor employing the principles of this invention. Here, a bowl 520 thereof is provided with a screen liner 532 extending from the bottom of the bowl 520 all the way to a point above the top of the particulate material therein. Because of the vibratory movement of the particles, the fine particles will move downward and out through the screen 532, while the larger particles will remain within the screen 532. Then, the small particles will be moved by vibratory action of the spiral track 524. A bar 526 disposed above the top of the screen 532 is adapted to catch particles above a predetermined size as they proceed up the spiral track 524, and return these particles to the vibratory bed. The fine particles then proceed unhindered atop the track 524 so that they can be removed.

Also shown in this embodiment are an over-feed air or gas inlet 540 for injecting gas from above to a gas inlet 528 at the bottom of the bed of particulate material.

FIG. 9 shows another vibratory bed reactor including a bowl 620 with a spiral groove 624 therein. In this embodiment, means are provided for returning fine particles to the bed of material, but permitting larger particles to be removed. These means include slots in the spiral track 624 and inclined guides 626 beneath the slots returning fine particles sifting through the slots to the bed of particles.

FIG. 10 shows a reactor with concentric gas feed inlet and gas outlet. In this embodiment, the upper chamber wall 712 of the device encloses a bowl 720 therewithin. A gas inlet pipe 740 is disposed coaxially about a gas outlet pipe 766, and supplies inlet gas to the base of the bed of particulate solids. The gas outlet pipe 766 extends from a point in the chamber above the upper surface of the bed of solid particles and extends downward and out through the gas inlet pipe 740. The chamber wall 712 is favorably sealed, so the only gas communication is through the pipes 740 and 766.

A feeder 752 for the solid particles is disposed over the bowl 720 and additional solid particles, when needed, through a sealed opening in the wall 712.

A number of possible feed arrangments for both the rotary and linear vibratory bed devices are shown in FIGS. 11A–13B, and are briefly described as follows.

In FIG. 11A, an over-fed reactor includes a bowl 820 having a screen liner 832 therein. The bowl 820 is mounted on springs 836 and is driven by driver solenoids 838. Fine ash particles or other fine particles can proceed upward over the spiral track 824.

Here, an over-feed device 850 supplies fuel or other solid particulate matter from above directly to the bowl 820.

FIG. 11B shows a similar arrangement employing a linear vibratory bed. Here, an over-feed arrangement 950 supplies fuel or other solid particles directly to the vibratory pan 920.

FIG. 12A shows an under-fed rotary vibratory reactor having a bowl 1020 with a screen liner 1032 therein. An air inlet 1040 extends through the bottom of the bowl 1020 and an auger-type under-feeder 1150, coaxial with the air inlet 1040, extends upwards to supply fresh solid particles to the bowl 1020.

FIG. 12B shows an under-fed arrangement of a linear vibratory bed device, in which an auger-type under-feeder 1150 coaxially disposed within an air inlet 1140 supplies fresh solid fuel or other solid particles from below a vibratory pan 1120 to the fuel bed in the pan 1120.

FIG. 13A shows a hybrid device in which solid particles are fed to a vibratory bowl both through an auger-type under-feeder 1250 and also through a hopper-type over-feeder 1252. Devices of this type are useful for mixing two separate types of particulate solid in the reactor bowl 1220, especially where it would be inappropriate to mix the two types of particles beforehand.

FIG. 13B shows an arrangment similar to that of FIG. 13A, but employing a linear vibratory pan 1320. Here, an air inlet 1340 has an auger-type under-feeder 1350 coaxially disposed therein to supply solid particles from below, while a hopper-type over-feeder 1352 supplies solid particles from above to the bed of particles in the pan 1320.

FIG. 14 shows a multi-bed arrangement formed of several stacked linear vibratory beds. A vibratory pan 1420 is arranged as a stack of several successive chambers 1420a, 1420b, 1420c, 1420d. In this embodiment, an under-feed device 1450 and an over-feed device 1452 both supply solid particles to the uppermost chamber 1420a, and the reaction products from this chamber 1420a are fed into the next successive chamber 1420b where a different reaction can take place. Here a fluid inlet 1440 supplies air or gas to the second chamber 1420b, and the reaction products therefrom are furnished therefrom to a third chamber 1420c, whose reaction products are furnished to a fourth chamber 1420d whose product is discharged into a solid product outlet 1460.

An auger-type solid particle under-feed device 1450' feeds solid reactant to the third chamber 1420c, while a gas inlet 1440' feeds gas to the fourth chamber 1420d. These, together from the reaction products furnished from the next previous stage, can all be components of a complex chemical reaction requiring several steps each carried out in a fluidized bed at different conditions.

It should be appreciated that the vibratory-type device as described hereinabove can be constructed of any desired size, as vibration, rather than compressed gas flow, is used to provide the fluidization of the solid particles. Consequently, as size presents no restraint to applications of this invention, devices according to this invention could be employed in virtually any industrial or commercial use, and could also be employed in railroad and marine environments.

Further, fuel and air input conditions can be varied in order to achieve specific objectives. That is, air or other gases can be preheated before introduction to the device, or air may be introduced at any desired level within the fluidized bed. Moreover, fuel may be fed in from above, from the side, or from below, either directly onto the top, or into the middle of the bed, thereby permitting the fuel supply to be constructed so as to require only a minimum of maintenance.

Although solenoid drive devices have been shown hereinabove, it should be understood that mechanical, pneumatic, hydraulic, or other known drive devices could be employed as well to impart vibration. Moreover, the drive mechanism need not have the drive frequency of 50 or 60 Hz described hereinabove, but can be at any suitable frequency. However, for minimum energy consumption, the system should be "tuned" to its natural frequency.

It is further apparent that the need for maintenance would be greatly reduced with respect to conventional alternative designs for furnaces and other reactors, because in the devices of this invention there are no moving parts to wear. The only parts for which slight movements might involve wear would be the packing material used as a glandular seal on the fuel and air inlet pipes, which, of course, is usually made of flexible material and could absorb the small amount of movement.

The solid particles employed for the reaction may be combustibles, noncombustibles, catalysts, or any combination of these. In fact, if a furnace embodying this invention is employed, it may be helpful to mix a small amount of refractory particles with the fuel to prevent formation of clinkers or the like. This can take the form of small spheres of aluminum oxide, or small shards of fire brick. In a furnace containing such particles in the vibratory bed, clinker formation is reduced because the temperatures are kept lower and because the noncombustible particles also serve to separate the ash particles from each other.

Further, it should be appreciated that the fluidized bed conditions are formed by vibratory action, rather than from the flow of pressurized gas therethrough, as is the case with conventional fluidized-bed furnaces. As a result, the need for large and powerful air compressors is avoided, and only a small blower sufficient to provide combustion air (or reactant gas) need be employed. Also, because the bed is fluidized without need for large volumes of air passing upwards through it, particulate contaminants remain in the bed, and are not carried out through the exhaust outlet. Moreover, because of the stratification of larger particles above smaller ones, the finer particulate matter tends to be suppressed below layers of larger particles, thus further preventing contamination of exhaust fumes with particulate matter.

Of course, a filter employing the principles of this invention can be used as a pollution-reducing device for processing the stack gases resulting from other combustion or reactor systems. By passing effluent gases containing contaminants through a fluidized bed of selected substances, some of which may have neutralizing properties, the level of those contaminants could be drastically reduced, and any fine particles would be trapped in the vibratory bed and could be removed.

It should be pointed out that vibratory fluidized bed reactors facilitate intimate contact of solid particles with the stream of fluid (usually a gas, but possibly also a liquid). This yields the beneficial properties of high heat transfer and high mass transfer between the fluid and the solid particles.

Still further, vibratory reactors according to this invention are not limited to furnaces and reactors that react a gas in the presence of a solid catalyst. For example, this invention could be embodied in an iron-ore-reduction reactor in which a hydrocarbon gas is converted in the presence of iron ore to carbon monoxide, but could also be used in an iron ore reduction reactor wherein the ore is reduced in the presence of coke and a gaseous hydrocarbon catalyst.

Additionally, a vibratory bed reactor would be well suited to the conversion or burning of waste materials from municipal, industrial, agricultural or mining sources, e.g. garbage, sugar cane residue and coal mining wastes. Those wastes are generally uneconomical to use, or costly to dispose of, in some cases because of a high content of incombustible minerals or fine particles. However, they would burn or react within a vibratory bed with resulting low pollution levels in the effluent.

The invention is certainly not confined to the embodiments described in detail above, and various modification and variations thereof would be apparent to persons of ordinary skill, without departure from the scope and spirit of this invention as defined in the appended claims.

What is claimed is:

1. Reactor apparatus for reacting a fluid stream in a fluidized bed of solid particles comprising
   vibratory bed means including a pan holding a bed of said solid particles therein, vibratory motion generating means imparting vibratory motion to said pan so that said bed of particles in said pan are vibrated to cause fluidization thereof, and retaining means on said pan rising from the surface of said pan for retaining and preventing the discharge of at least certain ones of the fluidized solid particles within the bed of solid particles in said pan, and
   means injecting said fluid stream into said fluidized bed of said solid particles.

2. Reactor apparatus according to claim 1, wherein said vibratory bed means includes a bowl having an upstanding side wall of generally cylindrical shape, with a generally spiral track thereon extending to a discharge point at a top rim of the bowl side wall.

3. Reactor apparatus according to claim 1, wherein said means injecting said fluid stream includes a diffusion plate formed as a portion of the bottom of said vibratory pan.

4. Reactor apparatus according to claim 1, wherein said fluid stream is a gaseous stream.

5. Reactor apparatus according to claim 4, wherein said reactor apparatus is constructed as a sorptive filter, said solid particles comprise materials for adsorbing or absorbing contaminants in said gaseous stream, and said gaseous stream is injected into the fluidized vibratory bed of said particles for cleaning it of said contaminants.

6. Reactor apparatus for reacting a fluid stream in a bed of solid particles, comprising
   vibratory bed means including a pan holding a bed of said solid particles therein, wherein said vibratory bed means includes a linear vibratory pan having a plate extending slopingly upwards in one direction from beneath an upper surface of said bed of solid particles to a discharge point for said solid particles above said upper surface, and vibratory motion generating means imparting vibratory motion to said pan so that said bed of particles in said pan are vibrated to cause fluidization thereof, and
   means for injecting said fluid stream into said fluidized bed of said solid particles.

7. Reactor apparatus according to claim 6, wherein said vibratory bed means further includes a screen disposed transversely across said pan and having a predetermined mesh to permit only particles below a predetermined size to pass therethrough to be conveyed up said surface toward said discharge point.

8. Reactor apparatus for reacting a fluid stream in a bed of solid particles comprising
   vibratory bed means including a pan holding a bed of solid particles therein, said vibratory bed means including as said pan a linear vibratory pan having a plate extending slopingly in one direction from beneath an upper surface of said bed of solid particles to a discharge point above said upper surface, and vibratory motion generating means imparting vibratory motion to said pan so that said bed of particles in said pan are vibrated to cause fluidization thereof, means injecting said fluid stream into said fluidized bed of said solid particles, and crushers disposed beneath the discharge point of said slopingly-extending plate to crush any particles over said predetermined size reaching said discharge point.

9. Reactor apparatus according to claim 8, wherein said vibratory bed means further includes a screen disposed transversely across said pan and having a predetermined mesh to permit only particles below a predetermined size to pass therethrough to be conveyed up said surface toward said discharge point.

10. Reactor apparatus for reacting a fluid stream in a bed of solid particles comprising vibratory bed means including a generally round bowl having a pan holding a bed of said solid particles therein, and vibratory motion means generally imparting vibratory motion to said pan so that said bed of particles in said pan are vibrated to cause fluidization thereof, and means injecting said fluid stream into said fluidized bed of said solid particles, wherein said means injecting said fluid stream includes a conic member disposed generally centrally on said pan, said conic member having a bottom rim distributing said fluid stream into said bed of particles below an upper surface thereof.

11. Reactor apparatus according to claim 10, wherein said conic member additionally has distribution ports along its conic side between said bottom rim and an apex thereof.

12. Reactor apparatus for reacting a fluid stream in a bed of solid particles comprising vibratory bed means including a pan holding a bed of said solid particles therein, wherein said vibratory pan has a solid side wall extending from near the bottom of said pan upward above the upper surface of said bed of particles to contain said particles therein, and a screen of a predetermined mesh extending from the bottom of said pan to said solid side wall passing particles smaller than its mesh size which gravitate to the bottom of the bed of particles, and vibratory motion generating means imparting vibratory motion to said pan so that said bed of particles in said pan are vibrated to cause fluidization thereof, and means injecting said fluid stream into said fluidized bed of said solid particles.

13. Reactor apparatus for reacting a fluid stream in a fluidized bed of solid particles comprising vibratory bed means including a pan holding a bed of said solid particles therein, wherein said pan has a screen side wall of a predetermined mesh extending from the bottom of said pan upward beyond the upper surface of the fluidized bed of solid particles, and passwng only those particles below the mesh size of said screen which gravitate to the bottom of the fluidized bed of particles, and vibratory motion generating means imparting vibratory motion to said pan so that said bed of particles in said pan are vibrated to cause fluidization thereof, and means injecting said fluid stream into said fluidized bed of said solid particles.

14. Reactor apparatus for reacting a fluid stream in a bed of solid particles comprising vibratory bed means including a pan holding a bed of said solid particles therein, said bed being formed as a bowl having an upstanding side wall of generally cylindrical shape, with a generally spiral track thereon extending to a discharge point at a top rim of the bowl side wall, and wherein said spiral track includes means returning particles below a predetermined size to said fluidized bed but permitting particles above said size to be conveyed to said discharge point, and vibratory motion generating means imparting vibratory motion to said pan so that said bed of particles in said pan are vibrated to cause fluidization thereof, and means injecting said fluid stream into said fluidized bed of said solid particles.

15. Reactor apparatus according to claim 14, wherein said means in said spiral track includes perforations in said track.

16. Reactor apparatus for reacting a fluid stream in a fluidized bed of solid particles comprising vibratory bed means including a pan holding a bed of said solid particles therein, vibratory motion generating means imparting vibratory motion to said pan so that said bed of particles in said pan are vibrated to cause fluidization thereof, and retaining means on said pan rising from the surface of said pan for retaining at least certain ones of the fluidized solid particles within the bed of solid particles in said pan, and means injecting said fluid stream into said fluidized bed of said solid particles;

wherein two streams of solid particles enter said reactor from separate supplies of said particles, and said reactor further comprises overfeed means for feeding one said stream of particles onto said bed from above the surface thereof, and underfeed means for feeding another said stream of particles into the bed from below the bottom of said pan.

17. Reactor apparatus for reacting a fluid stream in a fluidized bed of solid particles comprising vibratory bed means including a pan holding a bed of said solid particles therein, vibratory motion generating means imparting vibratory motion to said pan so that said bed of particles in said pan are vibrated to cause fluidization thereof, and retaining means on said pan rising from the surface of said pan for retaining at least certain ones of the fluidized solid particles within the bed of solid particles in said pan, and means injecting said fluid stream into said fluidized bed of said solid particles;

wherein said vibratory bed means includes a plurality of pans arranged one above the other to define a succession of chambers, with solid reaction particles from one chamber being furnished to the next successive chamber for carrying out another reaction.

18. In heating apparatus for use in burning solid fuel particles of the type which after combustion leaves ash residue and comprising a fuel chamber, a combustion chamber, means for introducing solid fuel into the fuel chamber, means for introducing air into the combustion chamber, exhaust means for venting exhaust gas from the combustion chamber, and a bed in said combustion chamber; the improvement wherein said bed includes a vibratory pan having a bottom, and a sloping linear plate extending substantially from said bottom in one direction upwards to a discharge edge above the upper surface of the fuel in said bed, vibratory drive means for driving said pan so that the ash residue resulting from said combustion is urged by vibration up said sloping plate to said discharge edge, and said apparatus further includes means for conducting away from said furnace said ash that is driven to said discharge edge.

19. A solid fuel burning furnace comprising a housing having a base and an exterior wall; a vibratory bed disposed at said base and having a bottom and a generally flat unidirectionally upwardly sloping plate for vibrationally transporting ash residue from said fuel up the sloping plate out of said bed to a discharge point at an upper edge of said plate; drive means for imparting a vibratory motion to said bed; fuel feed means extending into said housing depositing fuel into said bed; combustion chamber means defined by said bed and contained in a portion of said furnace thereabove; means for injecting air into said combustion chamber means; flue means for venting exhaust gasses from said combustion chamber means; and means coupled with said sloping plate of the vibratory bed for receiving said ash residue.

20. A solid fuel burning furnace according to claim 19, further comprising secondary air injecting means disposed in said combustion chamber means beyond said sloping plate for introducing secondary air into the combusting fuel and primary air at a distance from said bed thereby to ensure more complete combustion.

* * * * *